United States Patent [19]
Ostrander

[11] Patent Number: 4,878,522
[45] Date of Patent: Nov. 7, 1989

[54] PASTE HOPPER CONTROL SYSTEM

[75] Inventor: Paul R. Ostrander, Mississauga, Canada

[73] Assignee: Valmet-Sentrol Ltd., North York, Canada

[21] Appl. No.: 291,378

[22] Filed: Dec. 23, 1988

Related U.S. Application Data

[63] Continuation of Ser. No. 99,382, Sep. 19, 1987, abandoned.

[51] Int. Cl.$^4$ .................... H01M 4/82; H01M 4/20
[52] U.S. Cl. ...................................... 141/1.1; 141/32; 141/83; 29/2; 29/623.3
[58] Field of Search .................. 141/1.1, 32, 33, 98, 141/83; 29/2, 623.1, 623.3, 623.5; 118/679, 680, 682

[56] References Cited

U.S. PATENT DOCUMENTS

| | | | |
|---|---|---|---|
| 2,840,120 | 6/1958 | Lund | 141/32 |
| 2,949,940 | 8/1960 | Lozo | 141/32 |
| 3,951,688 | 4/1976 | Pankow et al. | 141/1.1 |
| 4,050,482 | 9/1977 | Ching et al. | 141/1.1 |
| 4,271,586 | 6/1981 | McCartney, Jr. | 29/623.5 |
| 4,606,383 | 8/1986 | Yanik | 141/32 |

FOREIGN PATENT DOCUMENTS 0088269 7/1980 Japan ........................ 141/32

Primary Examiner—Ernest G. Cusick
Attorney, Agent, or Firm—Shenier & O'Connor

[57] ABSTRACT

A paste hopper control system in which the weight and thickness of lead oxide paste applied to a stream of battery grid material from a hopper are independently controlled in response to in-line weight and thickness measurements obtained downstream of the paste hopper. Paste weight is independently controlled on the two sides of the stream by separately driving transversely spaced, independently rotatable hopper paddles in accordance with weight measurements obtained on the respective sides of the stream. Plate thickness is independently controlled on the two sides of the stream by adjusting the heights of the ends of a trowel roller in accordance with downstream thickness measurements and by adjusting the height of the hopper as a unit.

19 Claims, 4 Drawing Sheets

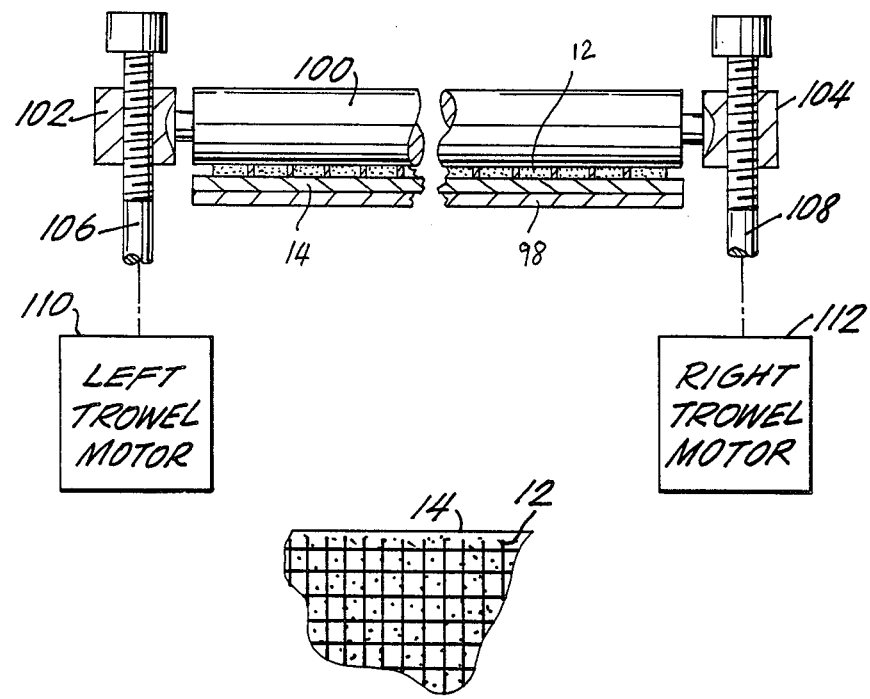
FIG. 2
FIG. 4
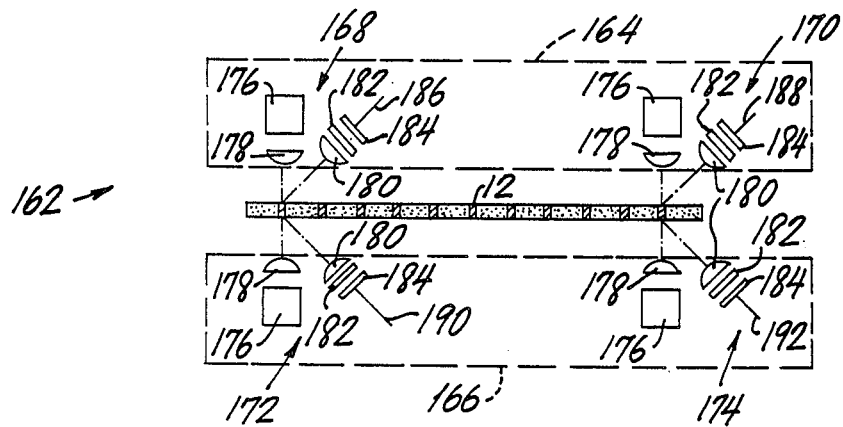
FIG. 3

4,878,522

PASTE HOPPER CONTROL SYSTEM

This is a continuation of co-pending application Ser. No. 099,382, filed on Sept. 17, 1987, abandoned.

BACKGROUND OF THE INVENTION

This application relates to a system for controlling the application of lead oxide paste to a grid to form a plate for a lead-acid storage battery.

Various systems for applying lead oxide paste to a grid to make a battery plate are known in the art, being described, for example, in Yanik U.S. Pat. No. 4,606,383, Lund U.S. Pat. No. 2,840,120, McDowall et al, U.S. Pat. No.4,307,758, Pankow et al U.S. Pat. No. 3,951,688 and Ching et al U.S. Pat. No. 4,050,482. Typically, in such prior-art systems, the amount of paste in the final product is regulated by measuring the weight or thickness of the plate off-line, using a scale or a caliper, and adjusting the width of a clearance gap through which the pasted grid passes. Such a procedure requires the continual attention of a human operator, and inevitably there is a considerable delay between the occurrence of a situation requiring attention and its subsequent detection and correction.

Moreover, implicit in this procedure is the notion that weight is a function of thickness, and vice versa. In fact, owing to the compressibility of the paste and the resulting variations in paste density, these quantities may vary independently. Thus a plate of constant thickness, while acceptable mechanically, may nevertheless exhibit variations in paste density over the area of the plate that are unacceptable from the standpoint of electrical performance. Conversely, an electrically acceptable plate of constant paste density may exhibit mechanically unacceptable variations in thickness. Finally, this procedure of the prior art does not address weight or thickness variations that may occur across the width of the pasted grid.

SUMMARY OF THE INVENTION

One of the objects of my invention is to provide a system that applies paste to a stream of grid material in a more accurately controlled manner than in systems of the prior art.

Another object of my invention is to provide a grid-pasting system that is simpler and less expensive to operate.

Still another object of my invention is to provide a grid-pasting system which minimizes density variations in the pasted grid.

A further object of my invention is to provide a grid pasting system which minimizes weight and thickness variations in the pasted grid.

A still further object of my invention is to provide a grid-pasting system which minimizes variations across the width of the pasted grid.

Other and further objects will be apparent from the following description.

One aspect of my invention contemplates apparatus for applying paste to a stream of grid material along a path in which means disposed along the path for applying paste to the material are controlled in response to means for measuring the amount of paste supplied to the material. Preferably, the measuring means is disposed along the path downstream from the paste-applying means, and measures the amount of paste applied to the material at each of a plurality of transversely spaced locations across the stream to permit independent control of paste application across the width of the stream.

The paste-applying means may comprise means, such as a hopper, for supplying paste to the material and means, such as a roller or blade cooperating with a conveyor belt, forming a clearance gap along the path for the passage of the pasted grid. Preferably, the measuring means comprises means for independently measuring the weight and thickness of the pasted grid, with the paste-supplying means being controlled in accordance with the weight measurement and the gap width being controlled in accordance with the thickness measurement.

Another aspect of my invention contemplates a method of applying paste to a stream of grid material in which paste is supplied to the material at a location along the path to form a plate and a clearance gap formed along the path for the passage of the plate, and in which the width of the clearance gap is controlled in accordance with the measured thickness of the plate following the clearance gap, while the supplying of the paste to the material is controlled independently of the clearance gap in accordance with the weight of the plate which is measured independently of the thickness.

Yet another aspect of my invention contemplates a method of applying paste to a stream of grid material in which the application of paste to the material at each of a plurality of locations across the width of the stream are independently controlled in response to respective measurements of the amount of paste applied to the material at those locations.

A further aspect of my invention contemplates apparatus for applying paste to a stream of grid material in which a stream of grid material is conveyed past an orifice formed in a paste hopper in which are disposed a plurality of transversely spaced applicator members, preferably independently rotatable members such as rollers or paddles, that are independently movable to control the application of paste to the material across the width of the stream.

BRIEF DESCRIPTION OF THE DRAWINGS

In the accompanying drawings to which reference is made in the instant specification and which are to be read in conjunction therewith and in which like reference characters are used to indicate like parts in the various views:

FIG. 2 is an enlarged fragmentary section taken along line 2—2 of FIG. 1.

FIG. 3 is an enlarged partly schematic section taken along line 3—3 of FIG. 1.

FIG. 4 is a fragmentary top plan of the pasted grid on the upstream conveyor belt of the system of FIG. 1.

DESCRIPTION OF THE PREFERRED EMBODIMENT

Figure 1:
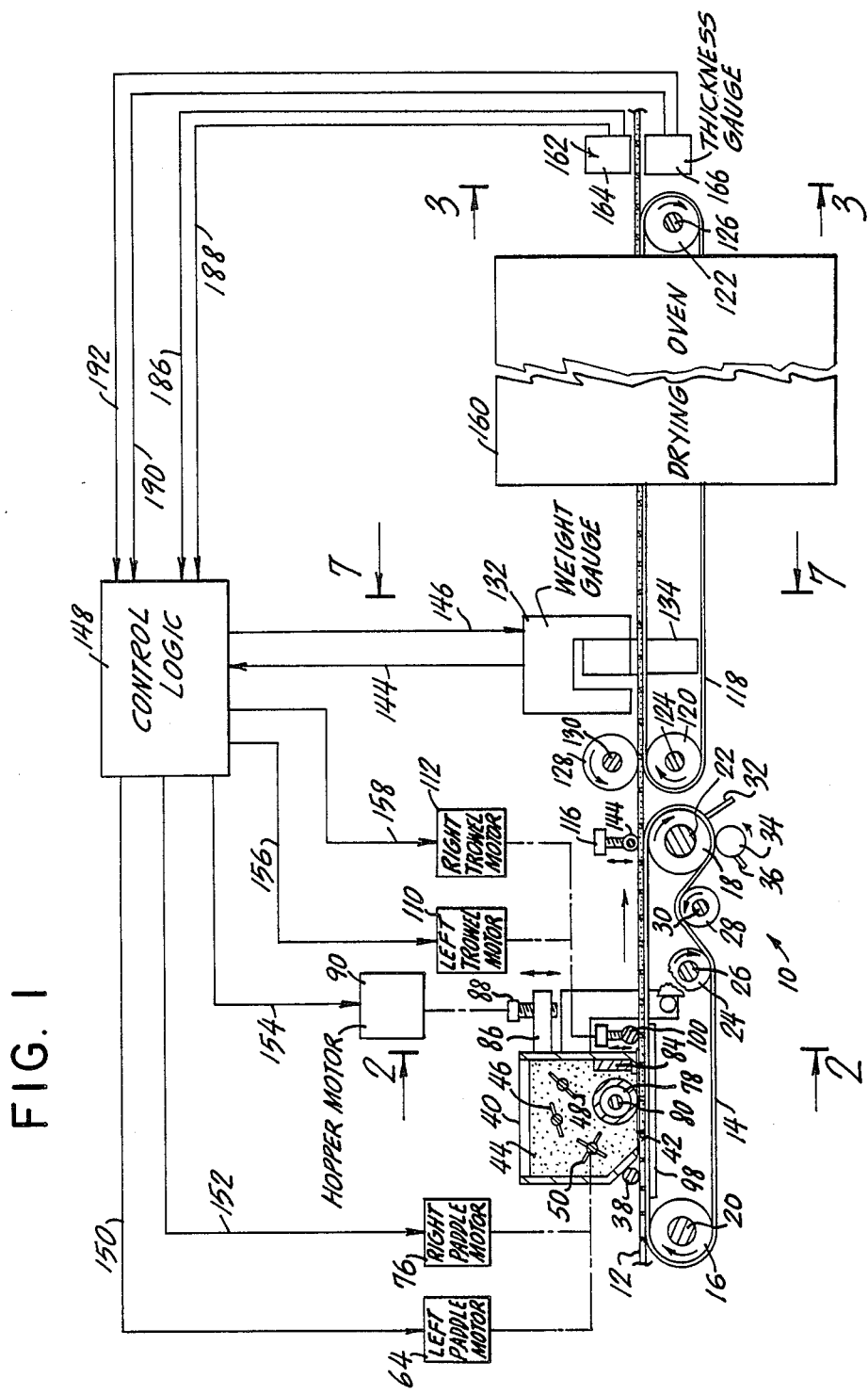
FIG. 1 is a partly schematic right side elevation of a control system embodying my invention.

Referring now to FIG. 1, a system embodying my invention, indicated generally by the reference numeral 10, controls the application of paste to a grid 12. Grid 12, which is also shown in FIG. 4, is fed from a suitable supply (not shown) preferably to a conveyor belt 14 supported by an upstream pulley 16 and a downstream pulley 18. Preferably belt 14 is formed of cotton to absorb thickness variations in the grid material 12, thereby to reduce the possibility of jamming or slippage relative to the belt. Respective shafts 20 and 22 support pulleys 16 and 18. An intermediate pulley 24 supported by a shaft 26 cooperates with a vertically adjustable pulley 28 supported by a shaft 30 to vary the tension in belt 14. One or both of pulley shafts 20 and 22 are driven in any suitable manner known to the art to advance the grid 12 to the right as viewed in FIG. 1. A scraper blade 32 engages belt 14 as it passes around the periphery of pulley 18 to remove any paste that has become adhered to the surface of the belt. A squeeze roller 34 located just downstream from scraper blade 32 presses against belt 14 to squeeze any excess liquid therefrom. An additional scraper blade 36 engages the surface of roller 34 to remove contaminants therefrom.

A preferably driven grid feed roller 38 rollingly engages the grid 12 as it is conveyed along with the upper run of belt 14 to guide the grid 12 past a paste hopper, indicated generally by the reference numeral 40, disposed above the belt 14. Except for the modifications in the control elements to be described, hopper 40 and belt 14 may be those of the paster available from MAC Engineering and Equipment Co., Inc., of Benton Harbor, Michigan, under the trademark "AUTOMAC". Hopper 40 is provided with an orifice 42 at the bottom thereof through which paste 44 flows from the hopper to grid 12. A pair of upper paddles 46 and 48 are rotated by any suitable means (not shown) to agitate the paste 44 to prevent it from solidifying.

Figure 5:
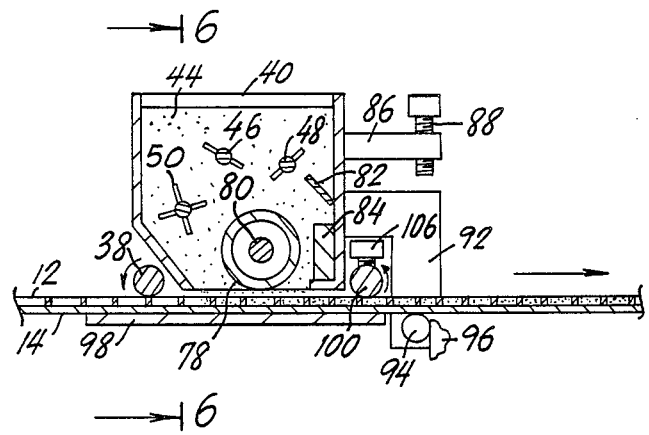
FIG. 5 is an enlarged section of the paste hopper of the system shown in FIG. 1.
Figure 6:
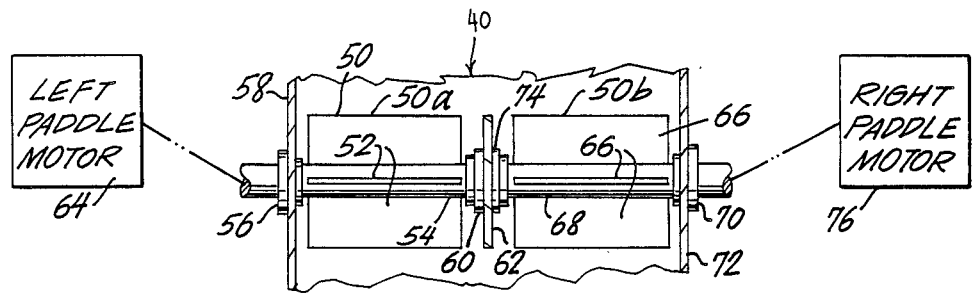
FIG. 6 is a fragmentary section of the paste hopper shown in FIG. 5 along line 6—6 thereof.

Referring now also to FIGS. 5 and 6, a lower paddle assembly, indicated generally by the reference numeral 50, consists of a left paddle indicated generally by the reference numeral 50a and a right paddle indicated generally by the reference numeral 50b. Left paddle 50a comprises a plurality of vanes 52—four in the particular embodiment shown—carried by a shaft 54. Shaft 54 is in turn supported by a bearing 56 carried by left hopper side wall 58 and by a center bearing 60 carried by a center bearing support 62. A variable-speed left paddle motor 64 of any suitable type known to the art is controlled in a manner to be described to rotate paddle 50a at the desired speed.

In a similar manner, right paddle 50b, which is coaxial with left paddle 50a, comprises a plurality of vanes 66 carried by a shaft 68. A first bearing 70 carried by right hopper sidewall 72 and a second bearing 74 carried by center bearing support 62 rotatably support shaft 68. A right paddle motor 76 of any suitable type known to the art is controlled in a manner to be described to drive shaft 68 at the desired speed.

A preferably knurled applicator roller 78 is disposed within paste hopper 40 just above the orifice 42. Roller 78, like paddle 50, applies pressure to the paste 44 which is pressed into the grid 12, thereby to assist paddle 50 in supplying paste from the hopper 40 to the grid passing beneath. A transversely extending shaft 80 supporting roller 78 is driven by any suitable means (not shown) to supply paste at the desired rate from the hopper. Hopper 40 also contains a transversely extending adjustable packing plate 82, the distance of which from applicator roller 78 may be changed to vary the pressure on the paste applied to the grid. In addition, hopper 40 contains a removable block 84 which may be made in a number of thicknesses further to vary the rate of flow of paste 44 from the hopper 40.

An arm 86 supporting hopper 40 is in turn carried by a lead screw 88. A hopper motor 90 (FIG. 1) is actuated in a manner to be described to rotate lead screw 88 in such a direction as to raise or lower hopper 40 as may be desired to control the thickness of the paste layer applied to grid 12. A lower arm 92 carried by hopper 40 carries a roller 94 which rolls along a vertically extending guide 96 as hopper 40 is raised or lowered. Raising or lowering hopper 40 has an effect on paste weight and plate thickness similar to that for adjusting towel roller 100.

Referring still to FIG. 1, a support plate 98 supports the upper run of conveyor belt 14 as it moves past hopper 40. A trowel roller 100 disposed at the outlet of hopper 40 bears against grid 12 to define a clearance gap between the roller 100 and the belt 14. Trowel roller 100 changes the pressure applied to the paste 44 in the roller nip and thereby regulates paste weight as well as the thickness of the pasted grid 12 leaving the hopper 40. Referring now also to FIG. 2, a pair of transversely spaced followers 102 and 104 carried by respective lead screws 106 and 108 support trowel roller 100. In a manner similar to that of hopper motor 90, a left trowel motor 110 and a right trowel motor 112 are adapted to be actuated in a manner to be described to rotate respective lead screws 106 and 108 to adjust the width of the gap formed by roller 100 on each side of the belt 14. Preferably, trowel roller 100 is driven by any suitable means (not shown) in a direction opposite to that of the grid 12 to create a shearing action driving back excess paste.

Upon emerging from the clearance gap defined by belt 14 and roller 100, grid 12 moves beneath a second trowel roller 144 located downstream of roller 100 opposite pulley 18. Respective lead screws 116 located on opposite sides of the belt 14 adjustably support the roller 144 in a manner similar to that of roller 100.

On emerging from the nip formed by roller 144 and pulley 18, grid 12 enters a second nip formed by an upper roller 128 supported by a shaft 130 and a lower pulley 120 supported by a shaft 124 and supporting one end of a conveyor belt 118. A downstream pulley 122 supported by a shaft 126 supports the other end of belt 118 so that it extends through a drying oven 160 of any suitable type known to the art. One or both of pulleys 120 and 122 is driven to advance belt 118.

Figure 7:
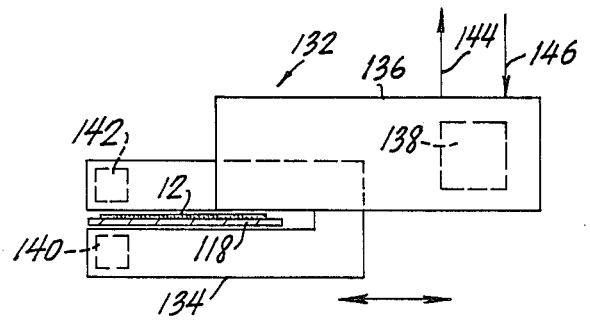
FIG. 7 is an enlarged section taken along line 7—7 of FIG. 1.

As the grid 12 supplied with paste 44 from the hopper 40 moves along with conveyor belt 118, it moves past a weight gauge indicated generally by the reference numeral 132. Referring now also to FIG. 7, weight gauge 132 comprises a C-bracket, indicated generally by the reference numeral 134, which is supported by a fixed housing 136 for movement transversely of the belt 118 in response to actuation of a motor 138. The lower arm of C-bracket 134 carries a radiation source 140 at the end thereof, preferably a gamma radiation source such as Americium 241. The upper arm of C-bracket 134 carries a gamma radiation detector 142 at the end thereof, opposite source 140. Radiation detector 142 supplies an output signal to the control logic to be described on line 144, while motor 138 responds to a signal supplied on a line 146.

Weight gauge 132 may be of any suitable type known to the art, such as the one sold by Valment-Sentrol Ltd., the assignee herein, under the trademark "GAM- MAGAGE". Since the attenuation of the gamma radiation emitted by source 140 varies with the mass per unit area of material between the source and detector 142, gauge 132 provides an accurate measure of the density of the paste 44 supplied to the grid 12, since the mass per area of the unpasted grid 12 and the belt 118 are known and can be assumed to be constant. Since the degree of attenuation of the radiation from the Americium 241 source is relatively unaffected by the moisture content of the paste 44, gauge 132 provides in effect a measure of the dry density, or dry paste mass per unit area, of grid 12. Thus, the system in effect regulates the weight of the final dried article, and is relatively insensitive to variations in the weight of the measured article that are due to moisture.

Upon clearing the downstream pulley 122 supporting belt 118, grid 12 moves past a thickness gauge indicated generally by the reference numeral 164 before advancing to a subsequent station (not shown) for a subsequent finishing operation such as cutting into separate plates. Referring now also to FIG. 3, thickness gauge 162 comprises an upper sensor head 164 extending across the width of the grid and a lower sensor head 166 extending across the width of the grid 12 in alignment with upper head 164. Upper head 164 in turn comprises a pair of transversely spaced optical displacement sensors 168 and 170, while lower head 166 correspondingly comprises a pair of optical displacement sensors 172 and 174 disposed at locations opposite sensors 168 and 170, respectively. Since each of the sensors 168 through 174 is identical except for its position relative to grid 12, the description that follows will be in reference to a particular sensor, sensor 168.

In sensor 168, a collimating lens 178 directs radiation from a source 176 onto the pasted grid 12 at a normal angle thereto. Although separate sources 176 are shown for sensors 168 to 174, each head 164 and 166 may alternatively employ a single source coupled to the various sensors by fiber optics or the like (not shown). Preferably, radiation source 176 comprises a double-heterojunction GaAs laser diode with a continuous power output on the order of 10–20 mW, operating at 820 nm with a band width of about 2 nm. Light back-scattered from the pasted grid 12 is collected by a lens 180 arranged with its optical axis forming an angle of about 45° with a normal to a surface of the grid. Lens 180 images the collected light through a narrowband (5 nm) interference filter 182 centered at about 820 nm onto a nonuniform silicon photodiode detector 184. Detector 184 is biased such that the detector output will be proportional to the position of the focused image along the detector strip. Detector 184 of sensor 168 provides an output on line 186. A rationing technique known to the art may be used to render the output of detector 184 insensitive to source intensity and minimize the temperature dependence of the detector.

In a similar manner, the detector 184 associated with sensor 172 provides an output on line 190 indicating the vertical displacement of the lower surface of pasted grid 12 opposite source 176. The thickness of the pasted grid 12 at that location is simply the difference between the displacements of the upper and lower surfaces of the grid 12. Likewise, the detector 184 associated with the sensor 170 located above the right side of the grid 12 provides an output on line 188 indicating the instantaneous displacement of the upper grid surface at that point. Similarly, the detector 184 associated with the sensor 174 located beneath the grid 12 opposite sensor 170 provides an output on line 192 indicating the instantaneous vertical displacement of the lower surface of the grid 12. Here as well, the thickness of the grid 12 is simply the difference between the upper and lower displacements.

Referring again to FIG. 1, the control logic, indicated generally by the reference numeral 148, may comprise either a special-purpose control circuit or, more typically, a suitably programed general-purpose digital computer. Since the details of computer implementation are not important to the present invention, and in any event would be apparent to those skilled in the art, they have been omitted for the sake of simplicity. As shown in FIG. 1, control logic 148 has output lines 150 and 152 to the left paddle motor 64 and right paddle motor 76, respectively, as well as a line 154 to hopper motor 90 and a pair of lines 156 to 158 to left trowel motor 110 and right trowel motor 112, respectively. Control logic 148 also receives output line 144 from weight gauge 132 and provides a control signal to motor 138 via line 146. Finally, control logic receives lines 186 to 192 from thickness gauge 162.

Figure 8:
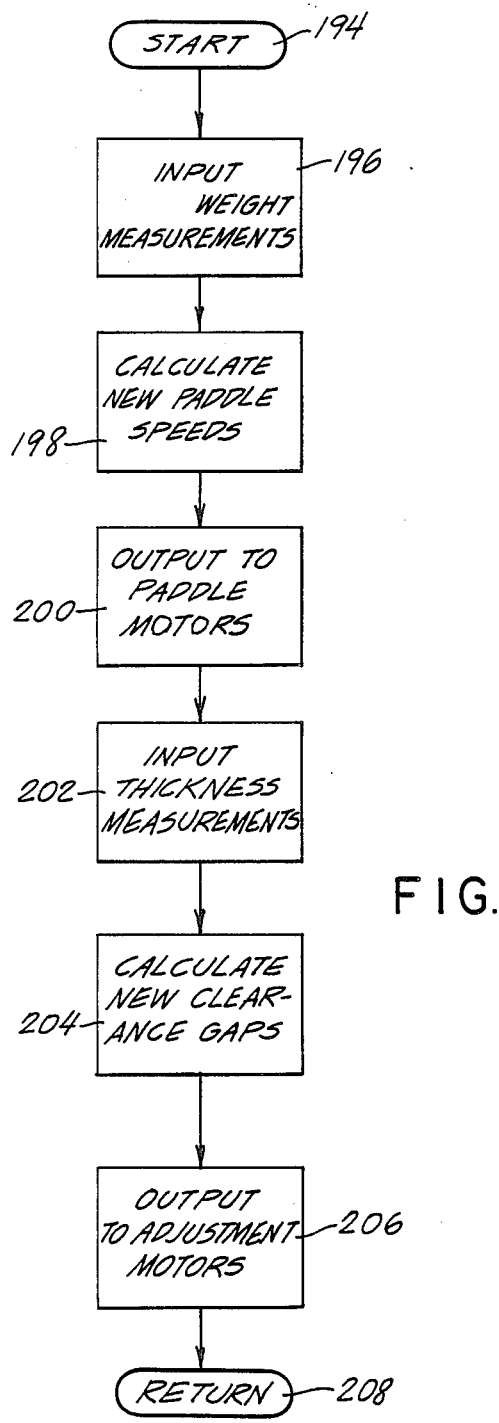
FIG. 8 is a flowchart of a control routine of the system shown in FIG. 1.

FIG. 8 shows a typical routine which may be followed by control logic 148 to control the thickness and weight of the pasted grid 12 in response to measurements thereof. Upon entering the routine (step 194), control logic 148 outputs appropriate signals to weight gauge scanner motor 138 (FIG. 7) on line 146 to move C-bracket 134 transversely of the grid 12 to enable the making of weight measurements at various locations across the width of the grid. In the particular embodiment shown, motor 138 may be actuated so as to obtain two measurements at different locations across the width of the grid 12. However, a greater number of measurements may be obtained should it be desirable in a given application. As the motor 138 advances bracket 134 to appropriate locations across the width of the grid 12, radiation detector 142 provides a signal on line 144 indicating the weight of the grid at that location.

After receiving the weight measurements from gauge 132 (step 196), control unit 148 calculates a new set of speeds for paddles 50a and 50b to maintain the weight on each side of the grid 12 at the desired value. For example, the speed of each of the paddle motors 64 and 76 may be changed by an amount proportional to the measured deviation between the measured weight on that side of the grid 12 and the desired weight. After calculating the new set of paddle speeds (step 198), control logic 148 supplies suitable signals on lines 150 and 152 to change the paddle speeds accordingly (step 200). This is typically accomplished by supplying motors 64 and 76 with voltage levels corresponding to the desired speeds.

The control unit 148 then receives the outputs from optical displacement sensors 168, 170, 172 and 174 of thickness gauge 162 (step 202) and, for each pair of upper and lower displacement sensors, calculates the thickness of the pasted grid 12 by simple subtraction. The control logic then compares these calculated thicknesses for each side of the grid 12 with previously stored value representing desired thicknesses to compute the thickness deviation on each side of the grid 12. On the basis of these calculations, the control logic 148 then calculates a new set of clearance gaps for the paste hopper 40 as well as for the trowel roller 100. In the case of the trowel roller 100, two clearance gaps are calculated, one for each side of the grid 12. Typically the clearance gaps for the paste hopper 40 and each end of the trowel roller 100 are changed by amounts that are proportional to the deviation of the measured thickness of the pasted grid 12 from the desired thickness. In the case of the trowel roller 100, the clearance gap at each end of the roller is calculated from the thickness measurement for the corresponding side of the grid 12. On the other hand, since the paste hopper 40 is raised or lowered as a unit, the revised clearance gap for the paste hopper is most suitably calculated on the basis of the deviation of the average of the two thickness measurements from the desired thickness.

After calculating the new clearance gaps (step 204), the control logic 148 supplies suitable control signals to hopper motor 90 and to trowel motors 110 and 112 to adjust the clearance gaps in the manner desired (step 206). When this has been done, the program control returns (step 208) to the calling program in preparation for another pass through the routine shown in FIG. 8.

Various modifications of the system described above will be apparent to those skilled in the art. Thus, while my invention is best applied to pasters using a belt to carry the grid past the pasting hopper, it may also be used where the grid is carried through the paster without the belt. Further, the unpasted grid may be in a discrete form, partially finished to size, rather than the strip form shown. Although not in accordance with one aspect of my invention, the paste weight may be measured manually with a laboratory scale rather than automatically with the in-line gauge shown.

Similarly, although not in accordance with one aspect of my invention, the plate thickness could be measured after the paster manually with a caliper or other thickness-measuring device rather than automatically with an in-line measuring device and with automatic feedback control as shown. Although, in the embodiment shown, plate thickness is controlled by adjusting both the hopper 40 and the trowel roller 100, either adjustment may be made alone if desired. Further, trowel roller 100 may be replaced by a nonrotating member such as a blade, and the support plate 98 moved relative to the hopper 40 rather than vice versa.

Other possible modifications relate to the application members in the hopper 40. Thus, the roller 78 could be modified so that, like trowel roller 100, its height is adjustable on both sides of the hopper 40. Roller 78 could also be split into transversely spaced sections (not shown) which could be independently raised or lowered while remaining parallel to a horizontal plane. Additionally, roller 78 could be given a variable-speed drive and be used, alternatively or in addition to paddle 50, to control paste weight. Although paddle 50 is, by virtue of its position, the most important paddle from the standpoint of control, the other paddles 46 and 48 could also be divided into variably driven, transversely spaced sections if desired. Additionally, roller 78 could be supplemented by a second, upstream roller, with paddle 50 being located between the rollers. Also, roller 78 could be eliminated, and one or more multiple-blade paddles used instead.

Similarly, packing plate 82 may be used, either alternatively or in addition to paddle 50 or roller 78, as a control element which is automatically adjusted in response to measured deviations in paste weight. Packing plate 82 may also be divided into transversely spaced sections (not shown) that are independently adjusted in response to measured weight deviations across the width of the stream. Trowel roller 100 can likewise be divided into transversely spaced sections for more independent control of plate thickness across the width of the stream.

It will be seen that I have accomplished the objects of my invention. My paste hopper control system applies paste to a stream of grid material in a more accurately controlled manner than in systems of the prior art, while being simpler and less expensive to operate. My system minimizes density variations by independently controlling paste weight and plate thickness, both along and across the width of the stream.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of applying paste to a stream of grid material including the steps of conveying said material along a path, supplying paste to said material at a location along said path to form a plate, forming a clearance gap along said path for the passage of said plate, measuring the thickness of said plate following said clearance gap, controlling the width of said clearance gap in accordance with said measured thickness, measuring the weight of said plate independently of said thickness, and controlling the supplying of paste to said material independently of said clearance gap in accordance with said measured weight.

2. A method of applying paste to a stream of grid material including the steps of conveying said material along a path, applying paste to said material at a plurality of locations across said stream, said locations being horizontally spaced from one another in a direction perpendicular to the direction of movement of said stream, measuring the amount of paste applied to said material at each of said locations independently of the amount applied at the remaining locations, and controlling the application of paste at each of said locations independently of the application of paste at the remaining location in accordance with said measured amounts.

3. Apparatus for applying paste to a stream of grid material including in combination a hopper for receiving said paste, said hopper having an orifice, means for conveying said stream of grid material paste said orifice, and a plurality of applicator members in said hopper, said members being aligned with one another with reference to the direction of movement of said stream, being equidistantly spaced in a predetermined direction from said stream and being spaced from one another in a direction perpendicular to said predetermined direction and the direction of movement of said stream, said members being independently movable to control the application of paste to said material across the width of said stream.

4. Apparatus as in claim 3 in which said applicator members are independently rotatable members.

5. Apparatus as in claim 3 in which said applicator members are paddles.

6. Apparatus for applying paste to a stream of grid material including in combination means for conveying said stream of grid material along a path, means for applying paste to said material at a plurality of locations across said stream, said locations being horizontally spaced from one another in a direction perpendicular to the direction of movement of said stream, means for measuring the amount of paste applied to said material at each of said locations independently of the amount applied at the remaining locations, and means for controlling the application of paste at each of said locations independently of the application of paste at the remaining locations in accordance with said measured amounts.

7. Apparatus for applying paste to a stream of grid material including in combination means for conveying said stream of grid material along a path, means disposed along said path for applying paste to said material to form a plate, means for measuring the thickness of said plate independently of the weight of said plate, and means responsive to said thickness-measuring means for controlling said applying means.

8. Apparatus as in claim 7 including means along said path for drying said plate, said thickness-measuring means being located downstream from said drying means.

9. Apparatus as in claim 7 in which said applying means comprises means for supplying paste to said material and means forming a clearance gap along said path for the passage of said plate, said controlling means controlling the width of said clearance gap.

10. Apparatus for applying paste to a stream of grid material including in combination means for conveying said stream of grid material along a path, means disposed along said path for applying paste to said material to form a plate, means for measuring the dry paste mass per unit area of said plate, and means responsive to said mass-measuring means for controlling said applying means.

11. Apparatus as in claim 10 in which said mass-measuring means comprises a gamma attention gauge.

12. Apparatus as in claim 10 in which said applying means comprises means for supplying paste to said martial and means forming a clearance gap along said path for the passage of said plate, said controlling means controlling said supplying means.

13. Apparatus for applying paste to a stream of grid material including in combination means for conveying said stream of grid material along a path, means disposed along said path for applying paste to said material to form a plate, means disposed along said path downstream from said applying means for irradiating said plate with radiation that is relatively unaffected by any moisture in said plate, means for measuring the amount of said radiation transmitted through said plate, and means responsive to said measuring means for controlling said applying means.

14. Apparatus as in claim 13 in which said applying means comprises means for supplying paste to said material and means forming a clearance gap along said path for the passage of said plate, said controlling means controlling said supplying means.

15. Apparatus as in claim 13 in which said measuring means comprises a gamma attenuation gauge.

16. Apparatus for applying paste to a stream of grid material including in combination means for conveying said stream of grid material along a path, means disposed along said path for applying paste to said material to form a plate, said applying means comprising means for supplying paste to said material and means forming a clearance gap along said path for the passage of said plate, means for measuring the thickness of said plate, and means responsive to said thickness-measuring means for controlling said applying means, said controlling means independently controlling the width of said clearance gap on opposite sides of said stream.

17. Apparatus for applying paste to a stream of grid material including in combination, means for conveying said stream of grid material along a path, means disposed along said path for applying paste to said material to form a plate, means for measuring the mass per unit area of said plate, said measuring means being relatively insensitive to any moisture in said plate, and means responsive to said mass-measuring means for controlling said applying means.

18. Apparatus as in claim 17 in which said mass-measuring means comprises means for directing radiation upon said plate and means for measuring the amount of said radiation transmitted through said plate.

19. Apparatus as in claim 17 in which said applying means comprises means for supplying paste to said material and means forming a clearance gap along said path for the passage of said plate, said controlling means controlling said supplying means.

* * * * *

UNITED STATES PATENT AND TRADEMARK OFFICE
CERTIFICATE OF CORRECTION

PATENT NO. : 4,878,522

DATED : November 7, 1989

INVENTOR(S) : Paul R. Ostrander

It is certified that error appears in the above-identified patent and that said Letters Patent is hereby corrected as shown below:

<u>In the Claims</u>:

Claim 2, col. 8, line 44, change "location" to --locations--;

Claim 3, col. 8, line 48, change "paste" to --past--;

Claim 11, col. 9, line 35, change "attention" to --attenuation--;

Claim 12, col. 9, lines 37 and 38, change "martial" to --material--.

Signed and Sealed this

Twenty-fifth Day of September, 1990

*Attest:*

HARRY F. MANBECK, JR.

*Attesting Officer*     *Commissioner of Patents and Trademarks*